(12) United States Patent
Hong et al.

(10) Patent No.: US 10,271,045 B2
(45) Date of Patent: Apr. 23, 2019

(54) APPARATUS FOR TESTING AN OBJECT

(71) Applicant: ISMEDIA CO., LTD., Gyeonggi-do (KR)

(72) Inventors: Seong Cheol Hong, Gyeonggi-do (KR); Jong Dae Lee, Gyeonggi-do (KR)

(73) Assignee: ISMEDIA CO., LTD., Anyang-si, Gyeonggi-Do (KR)

( * ) Notice: Subject to any disclaimer, the term of this patent is extended or adjusted under 35 U.S.C. 154(b) by 108 days.

(21) Appl. No.: 15/416,873

(22) Filed: Jan. 26, 2017

(65) Prior Publication Data

US 2017/0214910 A1 Jul. 27, 2017

(30) Foreign Application Priority Data

Jan. 26, 2016 (KR) .................. 10-2016-0009474

(51) Int. Cl.
| | |
|---|---|
| *G03B 43/00* | (2006.01) |
| *G03B 17/56* | (2006.01) |
| *H04N 17/00* | (2006.01) |
| *H04N 5/225* | (2006.01) |

(52) U.S. Cl.
CPC ......... *H04N 17/002* (2013.01); *G03B 17/561* (2013.01); *G03B 43/00* (2013.01); *H04N 5/2256* (2013.01)

(58) Field of Classification Search
CPC .............................. G03B 17/561; G03B 43/00
USPC .......................... 348/175–176, 180, 187, 189
See application file for complete search history.

(56) References Cited

U.S. PATENT DOCUMENTS

| | | | | |
|---|---|---|---|---|
| 7,789,356 B1* | 9/2010 | Jones | ..................... | F16M 11/16 248/178.1 |
| 9,983,464 B1* | 5/2018 | Kim | ..................... | G03B 17/561 |
| 2006/0119862 A1* | 6/2006 | Han | ..................... | G01B 11/2441 356/512 |
| 2006/0120088 A1* | 6/2006 | Guenther | ..................... | G01B 11/2441 362/362 |
| 2009/0180021 A1* | 7/2009 | Kikuchi | ..................... | H04N 5/2253 348/349 |
| 2009/0291215 A1* | 11/2009 | Makuta | ..................... | B41J 11/002 427/256 |
| 2015/0362122 A1* | 12/2015 | Brown | ..................... | F16M 11/041 348/208.2 |
| 2017/0214910 A1* | 7/2017 | Hong | ..................... | H04N 5/2256 |

FOREIGN PATENT DOCUMENTS

| | | |
|---|---|---|
| CN | 102235939 A | 11/2011 |
| CN | 202075116 U | 12/2011 |
| JP | 11-142343 A | 5/1999 |
| JP | 2008-309503 A | 12/2008 |
| JP | 2010-021985 A | 1/2010 |
| JP | 2013-101231 A | 5/2013 |
| KR | 100924115 B1 * | 10/2009 |
| KR | 1020130065305 A | 6/2013 |

\* cited by examiner

*Primary Examiner* — Paulos M Natnael
(74) *Attorney, Agent, or Firm* — Saliwanchik, Lloyd & Eisenschenk

(57) ABSTRACT

The present disclosure relates to an apparatus for testing an object, the apparatus including a guide means and a testing means, and capable of easily and quickly testing an object from a position where an operator wants, and of testing an object from various positions, thereby significantly improving the testing efficiency, and also having a simple configuration so that it is easy to manufacture and maintain at reduced cost.

17 Claims, 12 Drawing Sheets

APPARATUS FOR TESTING AN OBJECT

CROSS-REFERENCE TO RELATED APPLICATION

This application claims priority under 35 U.S.C. § 119 to Korean Patent Application No. 10-2016-0009474, filed Jan. 26, 2016, which is herein incorporated by reference in its entirety.

BACKGROUND

Field

The present disclosure relates to an apparatus for testing an object, and more particularly, to an apparatus for testing an object, that is capable of testing an object easily and quickly from a position that an operator wants, and of testing an object from various positions, thereby significantly improving the testing efficiency, and also having a simple configuration so that it is easy to manufacture and maintain at reduced cost.

Description of Related Art

The latest mobile equipment such as smart phones and tablet PCs are generally equipped with camera modules, and using such mobile electronic equipment that uses camera modules, photos or videos can be photographed.

A conventional camera module does not have a large number of pixels, and thus just a simple test in the manufacturing process is sufficient to test the camera module, but in recent days, as camera modules are becoming increasingly miniaturized with higher resolution and larger pixels, various tests such as focus test, resolution test, foreign substance test are conducted after a camera module is manufactured.

It is general to use a chart when testing the focus or the resolution of a camera module, and during these tests, the camera module and the chart are arranged to face each other in one direction such as on a vertical line or a horizontal line.

This leads to a problem of low testing efficiency, since in reality, users take photos or videos from various positions, for example, by holding the camera almost vertically or laying the camera towards the ground, whereas testing a camera module is not conducted from various positions.

Thus, sometimes a camera module test is conducted from various positions using a semi-circular chart having the shape of a dome, which is also a problem since it is difficult to use this type of semi-circular chart due to its high manufacturing and maintenance cost.

Therefore, there is need for an apparatus for testing an object, of which the aforementioned problems have been compensated.

PRIOR ART DOCUMENT

Korean Laid-open patent publication No. 10-2013-0065305

BRIEF SUMMARY

Therefore, a purpose of the present disclosure is to solve the aforementioned problems of prior art, that is, to provide an apparatus for testing an object, capable of testing an object easily and quickly from a position that an operator wants.

Another purpose of the present disclosure is to provide an apparatus for testing an object, capable of testing an object from various positions, thereby significantly improving the testing efficiency.

Another purpose of the present disclosure is to provide an apparatus for testing an object, having a simple configuration so that it is easy to manufacture and maintain at reduced cost.

The aforementioned purposes are achieved, according to the present disclosure, by an apparatus for testing an object, the apparatus including a guide means having the shape of an arc maintaining a predetermined distance from an object; and a testing means that is mounted onto the guide means such that it is moveable along the guide means and that moves to approach or distance away from the object in order to test the object Here, in the guide means, it is preferable that wherein gradations for measuring moved positions of the testing means are formed along the length of the guide means.

Here, it is preferable that the object is a camera module, and
that the testing means is configured to test at least one of a focus, a short distance resolution and a long distance resolution of the object.

Here, it is preferable that the testing means includes a moving unit that is mounted onto the guide means to move along a trajectory of the arc; and a testing unit that is mounted onto the moving unit and that approaches or distances away from the object.

Here, it is preferable that the testing unit comprises a guide unit that is mounted onto the moving unit such that one end of the guide unit faces the object and that moves to approach or distance away from the object; and a chart unit coupled to the guide unit such that the chart faces the object.

Here, it is preferable that the testing unit comprises a guide unit that is mounted onto the moving unit such that one end of the guide unit faces the object; and a chart unit that is coupled to the guide unit such that the chart unit faces the object and that moves to approach or distance away from the object in a direction of the length of the guide unit.

Here, it is preferable that gradations for measuring moved positions of the chart unit are formed along the length of the guide unit.

Here, it is preferable that the chart unit is configured to rotate at its position in a state where the chart unit is coupled to the guide unit.

Here, it is preferable that the chart unit further includes a backlight that emits light using a light source.

Here, it is preferable that the guide means has a shape of a semi-circle.

Here, it is preferable that the guide means consists of a plurality of semi-circular guide frames whose central parts are stacked one another, and the testing means is mounted onto both sides of the guide frame with regard to the central part where the plurality of guide frames are stacked one another.

Here, it is preferable that an opening is formed at a center of the guide frame, and the guide means comprises: a plurality of the guide frames stacked such that openings are in communication with one another; and a connecting pin that connects the plurality of the guide frames one another through the openings.

Here, it is preferable that the guide frame is configured to rotate about the connecting pin.

Here, it is preferable that at least one of the guide frame and the connecting pin is provided with gradations for measuring a rotation angle of the guide frame.

Here, it is preferable that the testing means is configured to be mounted onto the guide means so as to move by means of a rail or an electromagnet.

Here, it is preferable that the apparatus for testing an object further includes a position detection unit that detects at least one of a movement trajectory of the testing means, a latitude of the testing means and a longitude of the testing means when the testing means moves.

According to the present disclosure, there is provided an apparatus for testing an object, capable of testing an object easily and quickly from a position that an operator wants.

Further, the object may be tested from various positions, thereby significantly improving the testing efficiency.

Further, due to its simple configuration, the apparatus for testing an object may be easily manufactured and maintained at reduced cost.

DETAILED DESCRIPTION

Hereinafter, the apparatus for testing an object according to the present disclosure will be explained in detail with reference to the attached drawings. Here, a variety of objects may be used as an object to be tested by the testing apparatus, but hereinafter, explanation will be made based on an assumption that the object is a camera module, and the testing means used for testing such a camera module is exemplified as one configured to test one or more of a focus, a short distance resolution, and a long distance resolution of the camera module so that the focus or the resolution of the camera module may be measured.

Figure 1:
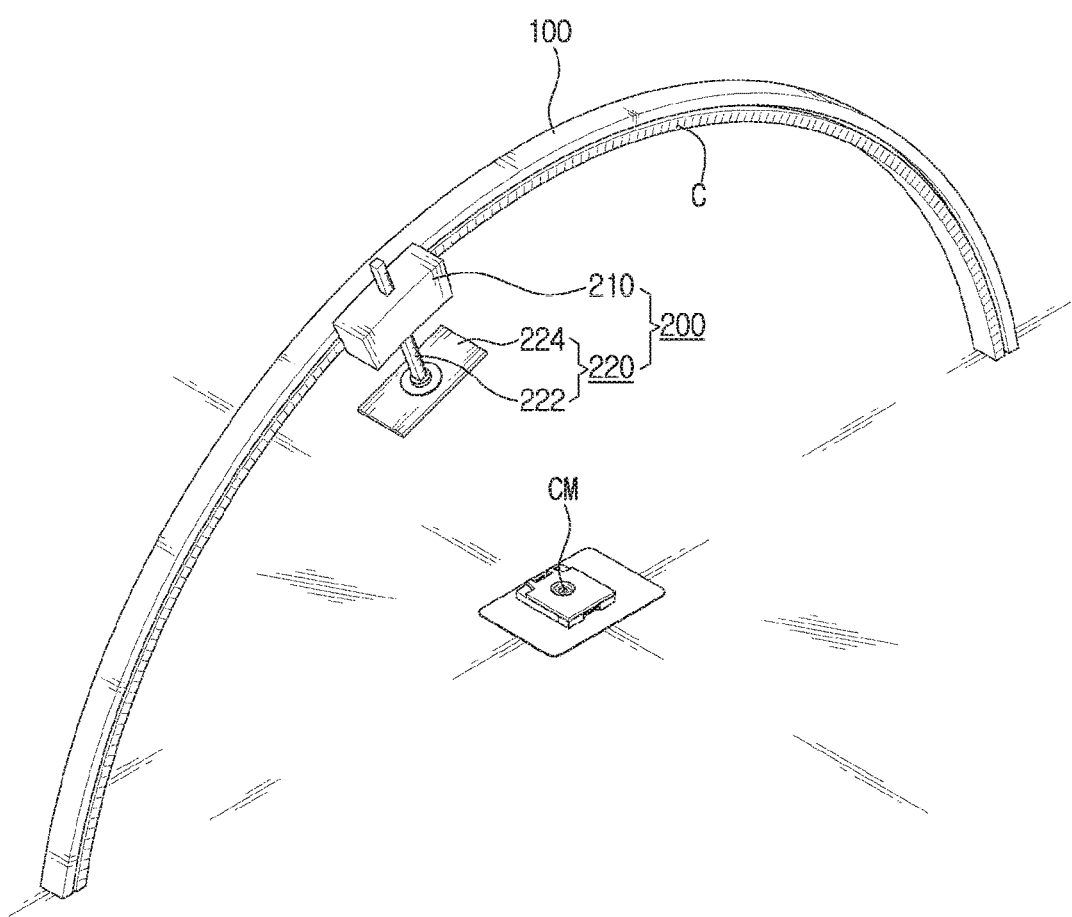
FIG. 1 is a schematic view schematically illustrating an apparatus for testing an object according to a first embodiment of the present disclosure.

FIG. 1 is a schematic view schematically illustrating an apparatus for testing an object according to a first embodiment of the present disclosure.

Referring to FIG. 1, the apparatus for testing an object according to the first embodiment of the present disclosure is configured to include largely a guide means 100 and a testing means 200.

The guide means 100 is a member that forms an arc shape whose center is an object CM. In particular, the guide means 100 is formed along a circumference of a virtually-drawn circle, wherein the object CM is positioned at a center of the virtual circle.

Such a guide means 100 is a frame having the shape of a bent stick, a bent pipe or a bent bar. Here, in FIG. 1, the guide means 100 is illustrated as having a semi-circular shape, but depending on the type or size of the object CM, or depending on the type of the test to be conducted by the testing means 200 that will be explained hereinafter, the shape of the guide means may form a shape where the length of the arc is extended to form a shape that is almost a circle, or a shape where the length of the arch is reduced to form a shape that is smaller than the semi-circle.

The testing means 200 is mounted onto the guide means 100 to test the object CM while moving along the guide means 100. The testing means 200 is mounted onto the guide means 100 in a rail method or in an electromagnetic method, but any other method in which the testing means 200 can move along the guide means 100 may be applied as well.

Such a testing means 200 includes a moving unit 210 and a testing unit 220.

The moving unit 210 is a member that may move along the guide means 100.

For this purpose, the moving unit 210 is mounted onto the guide means 100, that is, the moving unit 210 is mounted onto the guide means 100 in the rail method or in the electromagnetic method, to move along a trajectory in the shape of an arc along the guide means 100. Accordingly, the moving unit 210 moves along the guide means 100 always maintaining a predetermined distance from the object CM.

On the guide means 100, gradations C (scales for measuring moved positions) are formed along the length of the guide means 100, so that when the testing means 200 moves, especially when the moving unit 210 moves, the position of the moving unit 210 may be identified. Therefore, a moved position of the testing means 200 may be measured by the gradations.

The testing unit 220 is a member that tests the object CM.

The testing unit 220 is mounted onto the moving unit 210, and operates such that it approaches or distances away from the object CM. Especially, in the present disclosure, the object CM is positioned at a center of a virtual circle, and the moving unit 210 moves along the guide means 100 formed along the circumference of the virtual circle, therefore enabling the testing unit 22 to always face the object CM.

The testing unit 220 performs an operation of approaching or distancing away from the object CM at the same time of being moved by the moving unit 210. Therefore, the testing unit 220 may conduct a test after changing its position distanced from the object CM. In other words, the testing unit 220 may test the object CM from various positions.

Figure 2A:
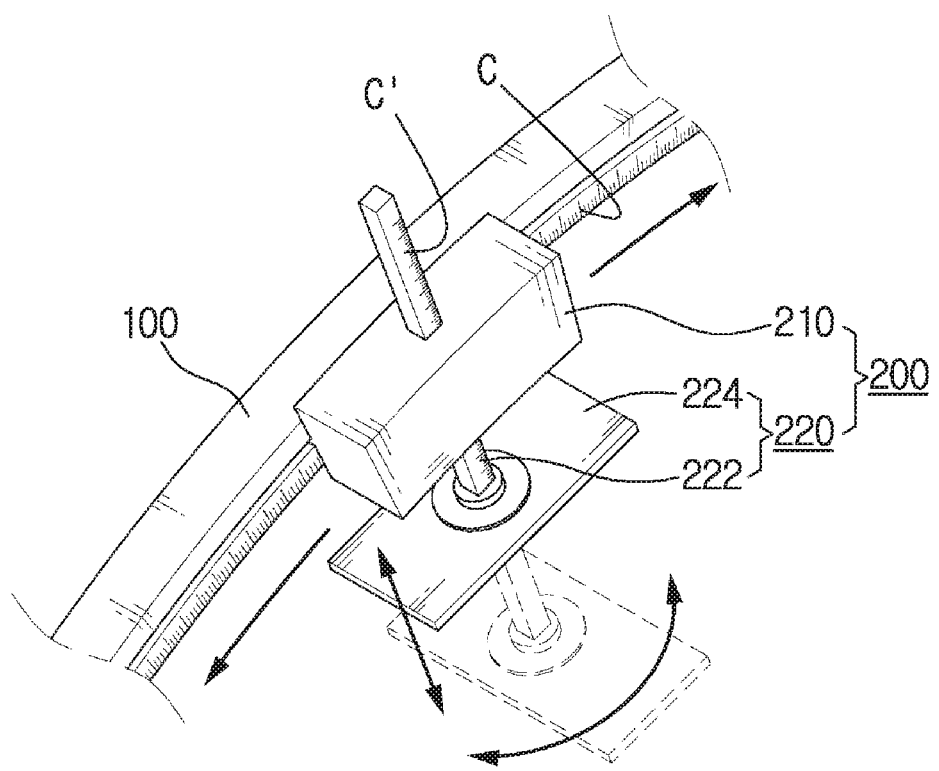
FIGS. 2A and 2B are enlarged views of some parts of the apparatus for testing an object illustrated in FIG. 1.
Figure 2B:
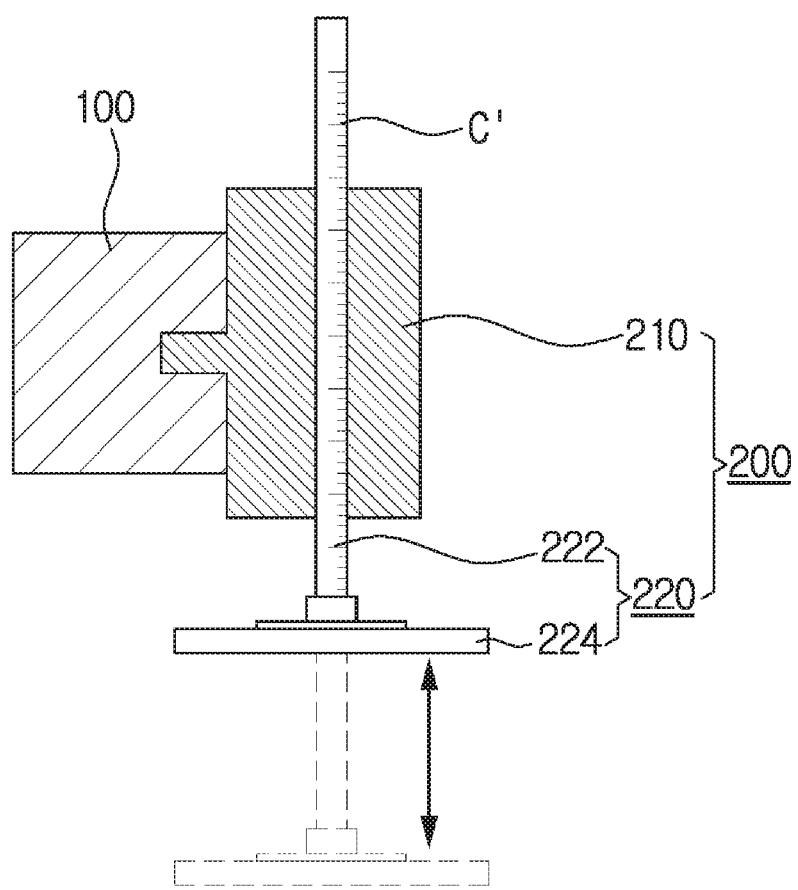

FIGS. 2A and 2B are enlarged views of some parts of the apparatus for testing an object illustrated in FIG. 1. FIG. 2A illustrates a part of the apparatus for testing an object, illustrated in FIG. 1, and FIG. 2B illustrates a cross-sectional view of a part of the testing apparatus illustrated in FIG. 2A.

Referring to FIGS. 2A and 2B, the guide means 100 consists of one frame (guide frame), and the moving unit 210 is mounted onto one side surface of the guide means 100 and moves along the guide means 100.

The testing unit 220 mounted onto the moving unit 210 includes a guide unit 222 and a chart unit 224.

The guide unit 222 is a member that extends towards the object and that is mounted onto the moving unit such that its one end faces towards the object (hereinafter referred to as camera module), and that moves to approach or distance away from the camera module CM.

According to the drawings, the chart unit 224 is coupled to a lower end of the guide unit 222 to face the camera module CM. The chart unit may consist of a chart including a pattern for adjusting focus of the camera module CM, a chart including a testing pattern for measuring the resolution, for example, a PIMA chart capable of measuring SFR (Special Frequency Response), and a chart capable of testing MTF (Modulation Transfer Function), so that a focus or a resolution of the camera module CM can be measured.

According to an operation of the guide unit 222, that is, according to an operation of the guide unit 222 approaching or distancing away from the camera module CM, the chart unit 224 approaches or distances away from the camera module CM. It is desirable that, on the guide unit 222, gradations C' (gradations for measuring moved positions) for measuring moved positions of the chart unit 224 are formed along the length of the guide unit 222, so that the position of the chart unit 224 according to the operation of the guide unit 222 may be identified.

Further, in order to enable various tests to be conducted on the camera module CM, the chart unit 224 may be configured to be rotatable at its position (or rotatable at the same place) in a state where it is coupled to the guide unit 222.

Meanwhile, when testing the camera module CM, a lighting equipment (not illustrated) such as an LED or a halogen lamp is generally used to light up the inner portion of the testing apparatus, or irradiate light to the camera module CM while conducting the test. Such lighting equipment may be separately provided inside the testing apparatus, but it is better to install a backlight that emits light using a light source onto the chart unit 224, so that the testing of the camera module CM may be conducted more smoothly.

FIG. 3 and FIG. 4 are enlarged views of some parts of the apparatus for testing an object according to a second and a third embodiment of the present disclosure.

Figure 3A:
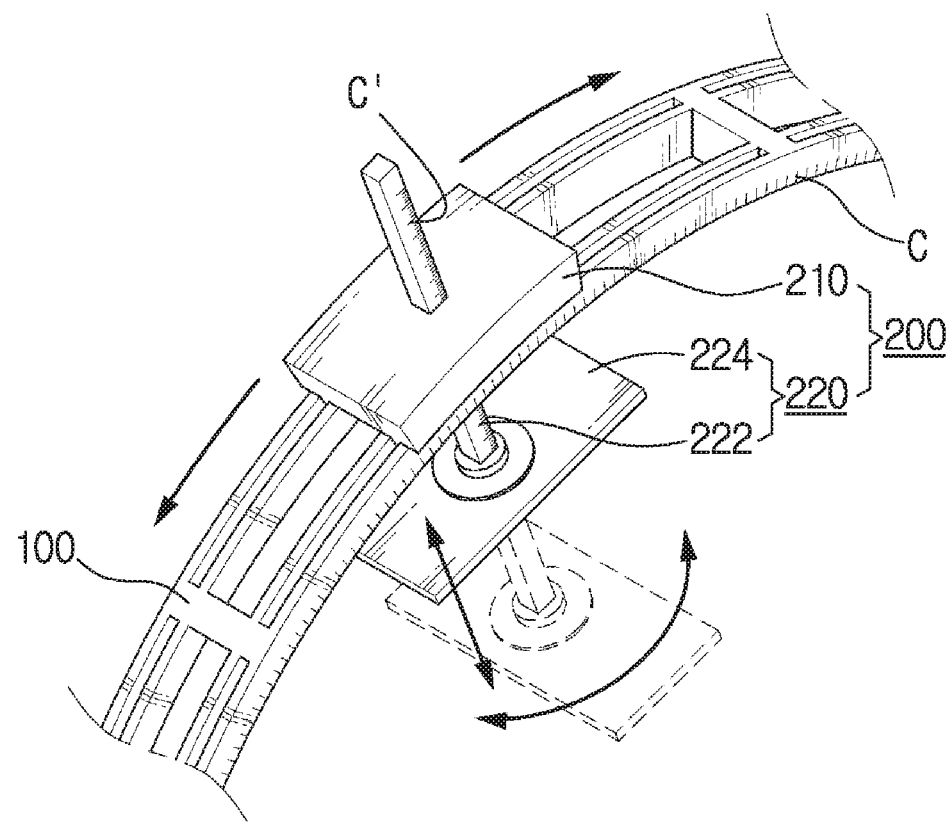
FIGS. 3A and 3B and FIGS. 4A and 4B are enlarged views of some parts of the apparatus for testing an object according to a second and a third embodiment of the present disclosure.
Figure 3B:
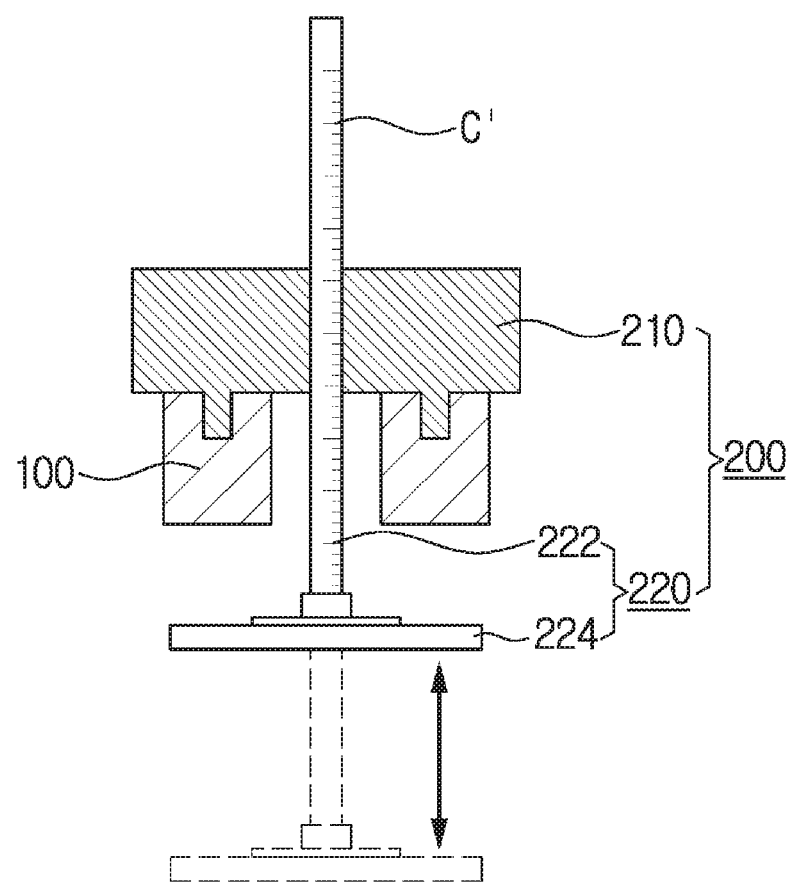

First of all, FIG. 3A is an enlarged view of the apparatus for testing an object according to the second embodiment, and FIG. 3B is a cross-sectional view of FIG. 3A.

Such an apparatus for testing an object according to the second embodiment of the present disclosure is configured to be similar as that of the aforementioned first embodiment, except that the shape of the guide means 100 and the position of the moving unit 210 mounted onto the guide means 100 to move are different from those in the first embodiment.

That is, in the second embodiment, the guide means 100 consists of two frames having an identical semi-circular shape, and the two frames are connected by a plurality of cross-arms.

The moving unit 210 is mounted onto an upper surface of the guide means 100, so that it may move along the guide means 100. The guide unit 222 is installed to penetrate the moving unit 210 and the guide means 100, and moves between two cross-arms. Further, the chart unit 224 coupled to the guide unit 222 approaches or distances away from the camera module CM, and on the guide unit 222, gradations C' for measuring moved positions of the chart unit 224 are formed.

Further, the chart unit 224 is configured to be rotatable at its position in a state where it is coupled to the guide unit 222 so that various tests may be conducted on the camera module CM, and a backlight that emits light using a light source may be installed on the chart unit.

According to such an apparatus for testing an object according to the second embodiment, the moving unit 210 moves between a cross-arm and another cross-arm of the guide means 100 by the guide unit 222, and a plurality of testing means 200 may be used depending on the distance between a cross-arm and another cross-arm.

Figure 4A:
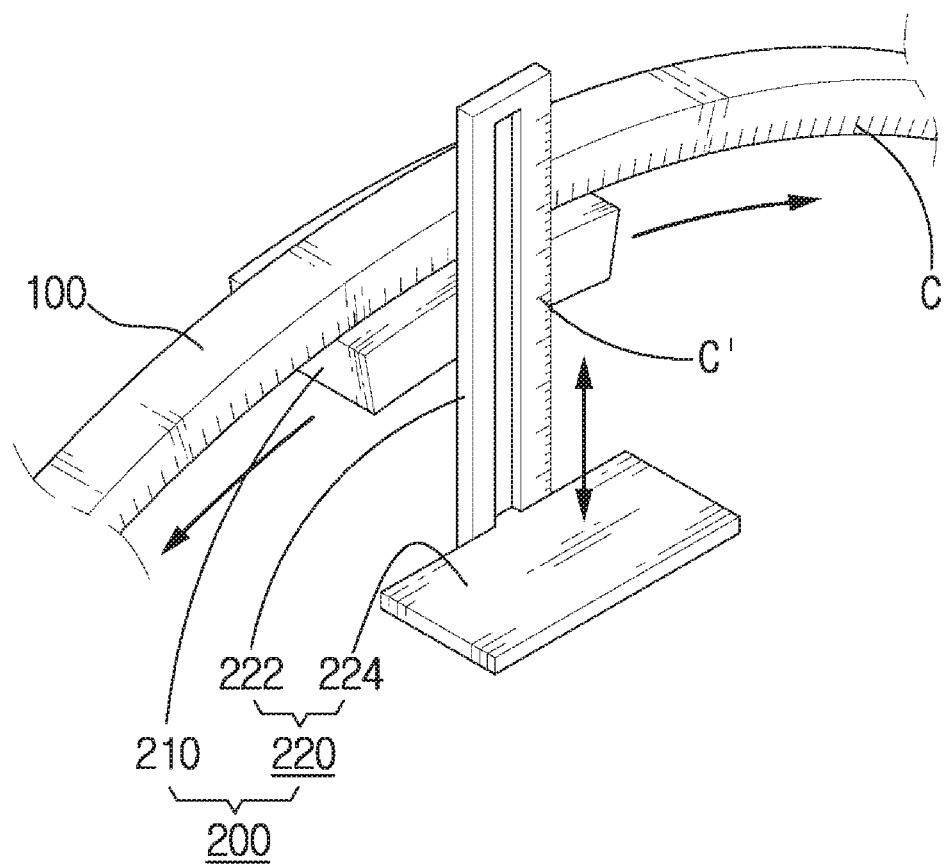
Figure 4B:
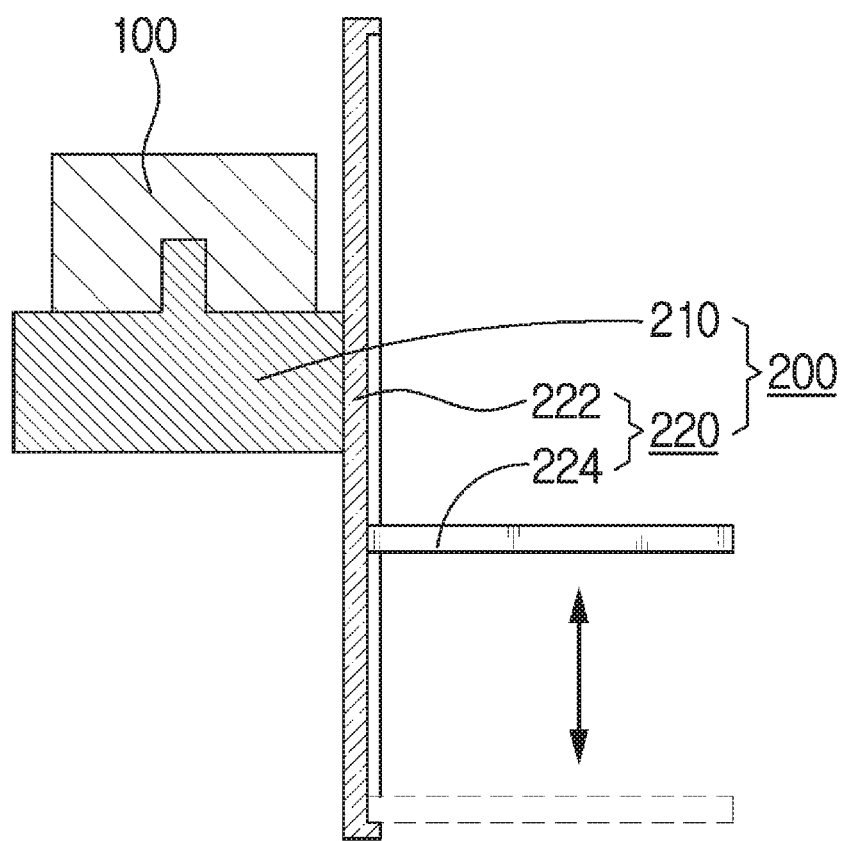

FIG. 4A illustrates an enlarged view of a part of the apparatus for testing an object according to a third embodiment, and FIG. 4B illustrates a cross-sectional view of FIG.

The apparatus for testing an object according to the third embodiment of the present disclosure is configured to be similar as that of the first or the second embodiment, except that, the position of the moving unit 210 that is mounted onto the guide means 100 to move and the testing unit 220 are configured differently from those of the first or the second embodiment.

As illustrated in FIGS. 4A and 4B, the guide means 100 used in the third embodiment consists of one frame (guide frame) just as in the first embodiment, and the moving unit 210 is configured to be mounted onto a lower side of the guide means 100 to move.

Further, the testing unit 220 consists of a guide unit 222 and a chart unit 224 just as in the first and second embodiments. In this regard, the guide unit 222 in the first and the second embodiment is configured to approach or distance away from the camera module CM side, but in the third embodiment, the guide unit 222 is fixed to a side surface of the moving unit 210 so as not to move, and the chart unit 224 coupled to the guide unit 222 to face the camera module CM approaches or distances away from the camera module CM in a direction of the length of the guide unit 222.

Gradations C' for measuring moved positions are formed on the guide unit 222 in this third embodiment as well, so that a moved position of the chart unit 224 may be identified.

Further, on the chart unit 224, a backlight for emitting light using a light source may be installed.

As shown in FIGS. 2 to 4 regarding the first to the third embodiments, the location where the moving unit 210 is mounted onto the guide means 100 is not limited to a certain position of the guide means 100. But, instead, the moving unit may be mounted onto a suitable position selected from a side surface, an upper surface, and a lower surface of the guide means 100 depending on the testing environment, manufacturing cost of the testing apparatus and the like.

Further, although not illustrated in the drawings, in case that a guide means 100 having the shape of an empty pipe is used, the moving unit 210 may be mounted such that it is positioned inside the guide means 100.

Figure 5:
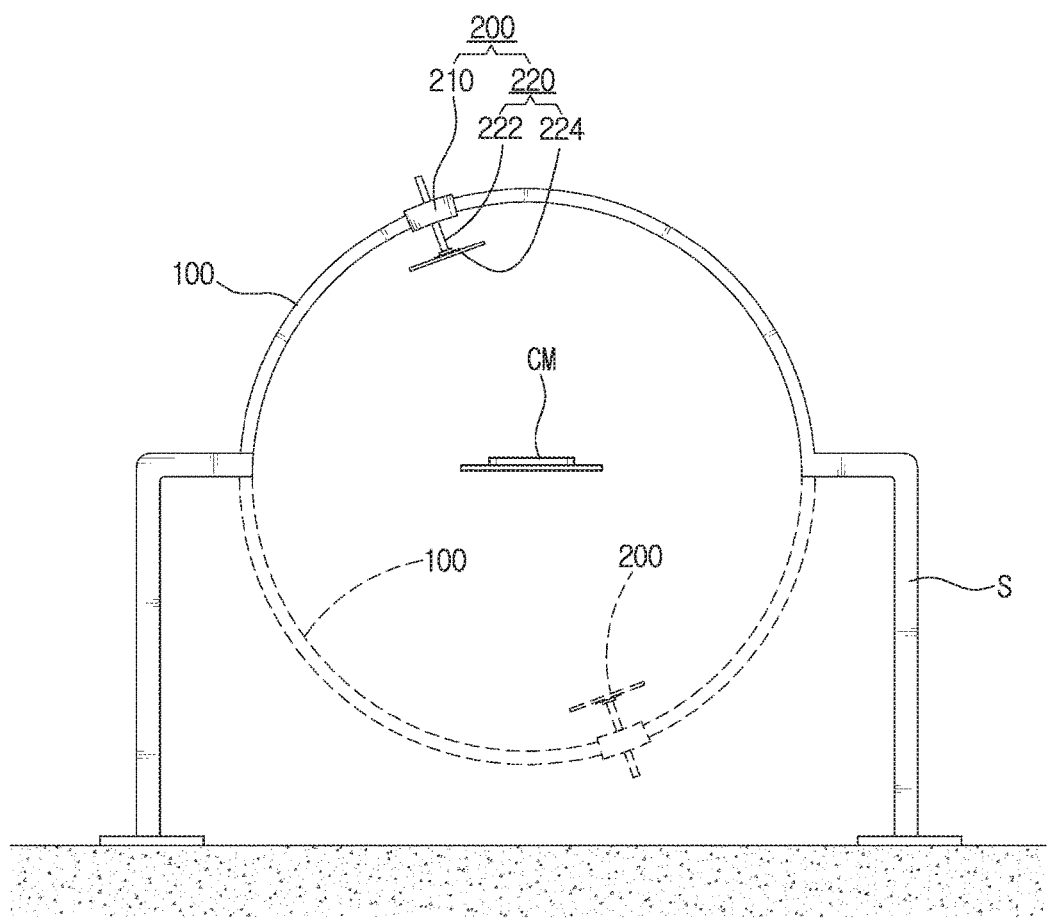
FIG. 5 is a schematic view schematically illustrating the apparatus for testing an object according to a fourth embodiment of the present disclosure.

FIG. 5 is a schematic view schematically illustrating an apparatus for testing an object according to a fourth embodiment of the present disclosure. Here, the gradations C, that is, the gradations for measuring moved positions are omitted from the guide means illustrated in FIG. 5.

As illustrated in FIG. 5, the apparatus for testing an object according to the fourth embodiment of the present disclosure uses a separate support S connected to both sides of the guide means 100 to support the guide means 100.

That is, the guide means 100 is not fixed to a testing stand (not illustrated) where the camera module CM is seated to be tested nor fixed to a bottom of the testing apparatus, but it is spaced apart from the ground by the support S such that it floats in the air.

Due to this support S, the guide means 100 having the shape of a semi-circle and the testing means 200 are positioned at an upper side in the drawing, thereby a test can be conducted in a state where the camera module CM is facing towards the upper side.

Further, if a guide means 100 of a semi-circular shape illustrated in dotted line at a lower side in FIG. 5 or a guide means 100 smaller than the lower semi-circular guide means is provided to the apparatus according to circumstances, it is possible to test the camera module CM even when the camera module CM is facing towards the lower side. Therefore, it is possible to test the camera module CM from various positions.

Figure 6:
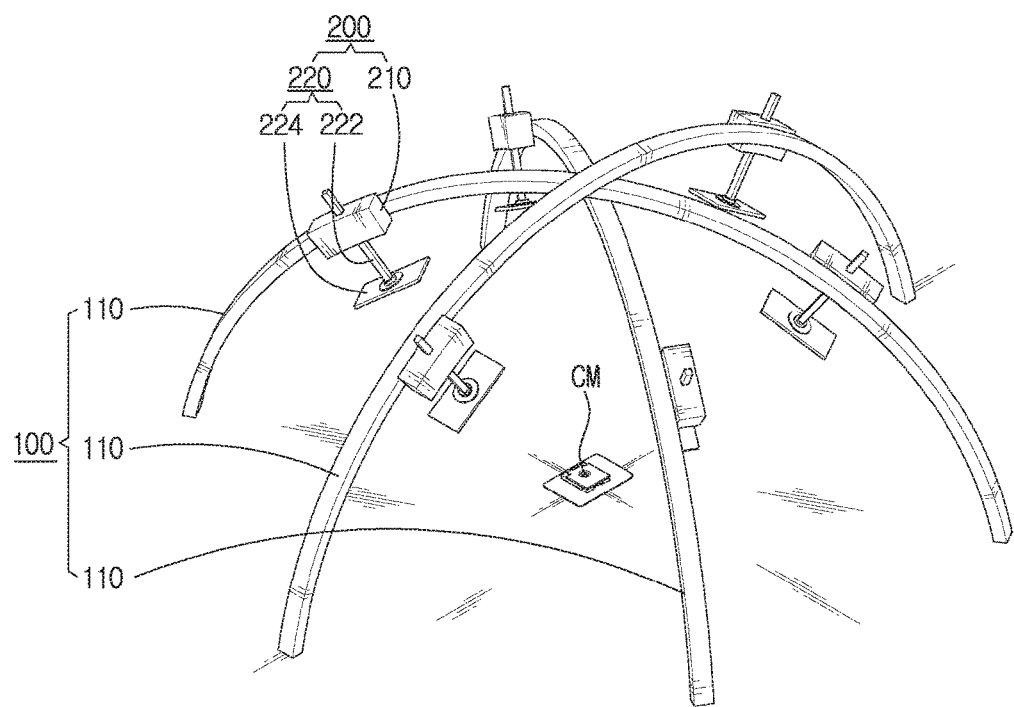
FIGS. 6 to 8 are schematic views schematically illustrating the apparatus for testing an object according to a fifth to a seventh embodiment of the present disclosure.
Figure 7A:
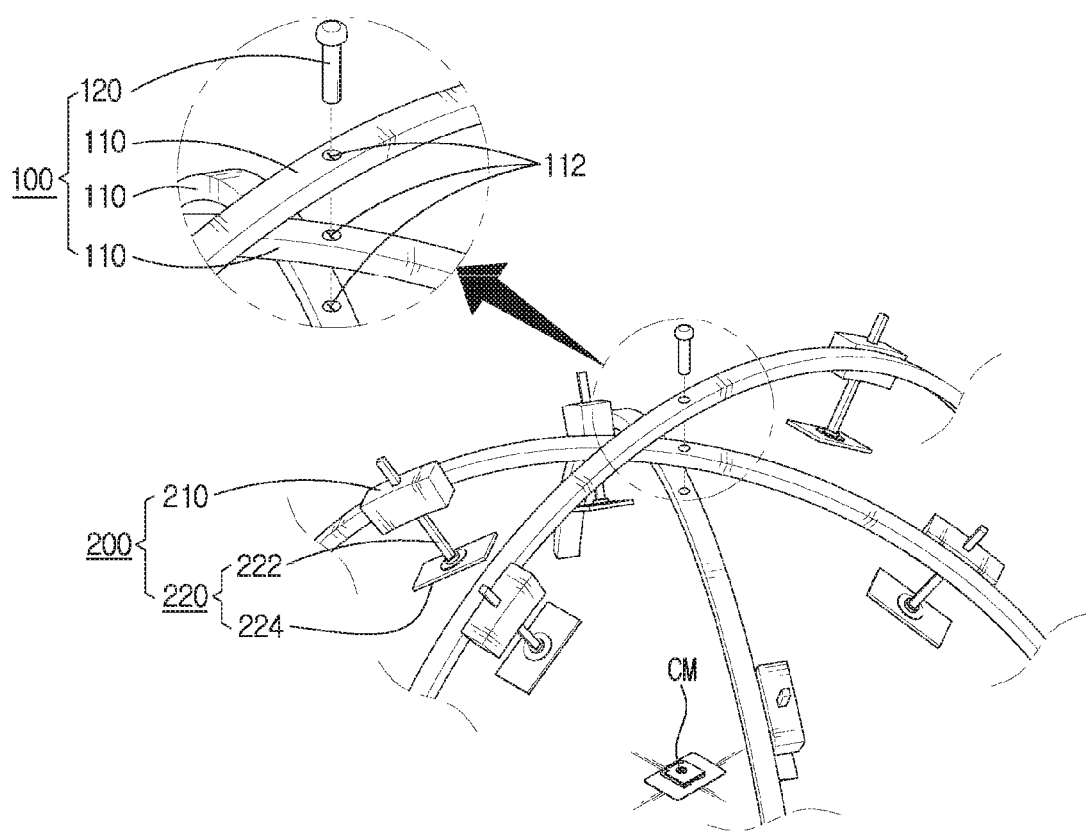
Figure 7B:
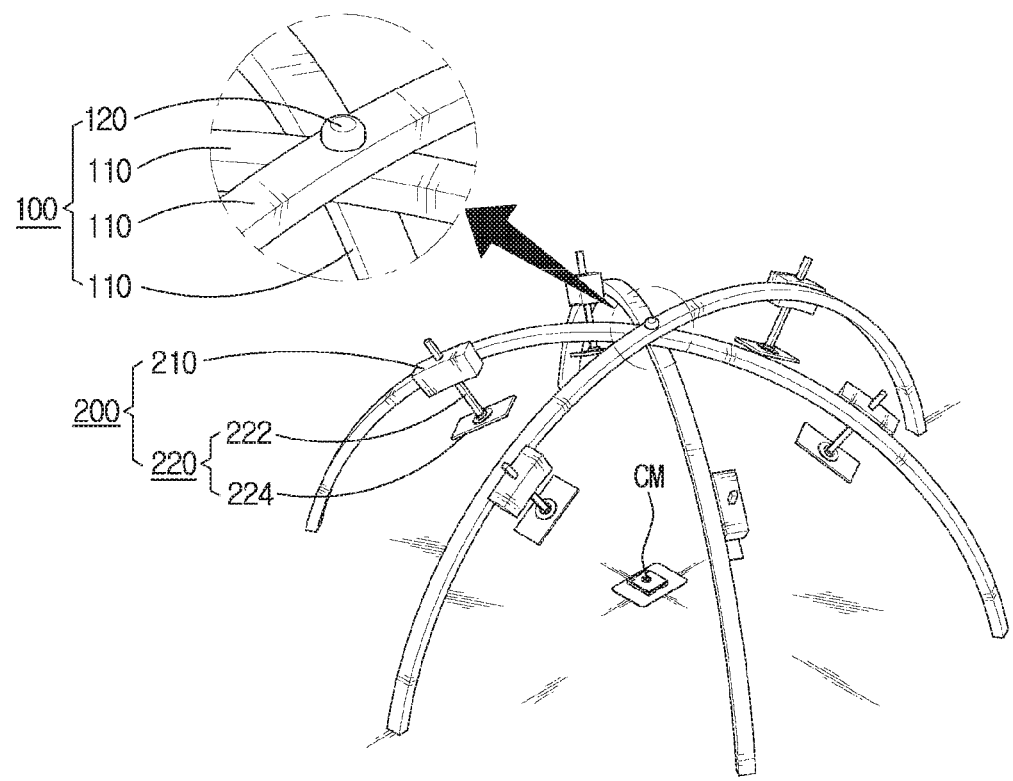
Figure 8:
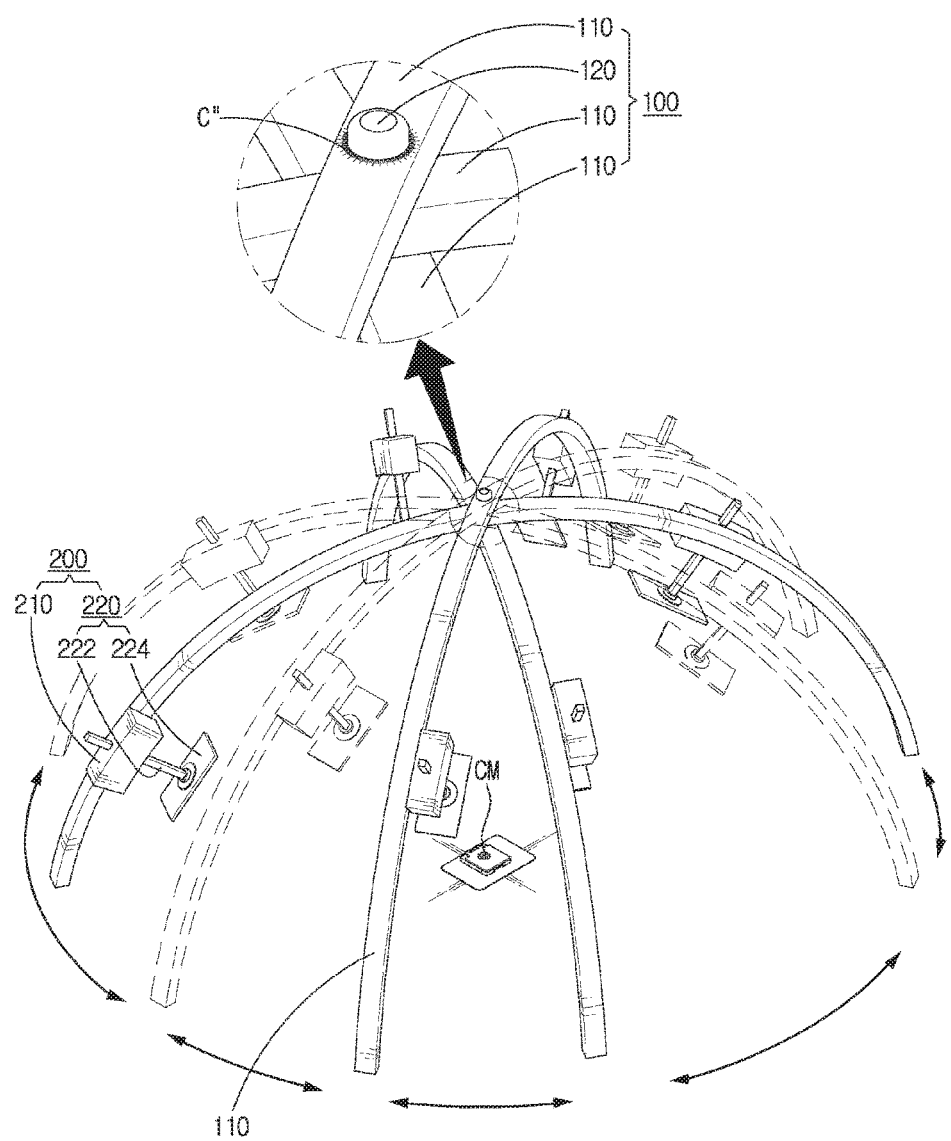

FIGS. 6 to 8 are schematic views schematically illustrating the apparatus for testing an object according to a fifth to a seventh embodiment of the present disclosure. Here, in order to prevent complexity of the drawings, the guide means, that is, the guide frame is illustrated without the gradations C for measuring moved position.

First of all, as illustrated in FIG. 6, in the apparatus for testing an object according to the fifth embodiment of the present disclosure, the guide means 100 consists of a plurality of guide frames 110. That is, the guide means 100 consisting of one frame as set forth in the first to the third embodiments is provided in a multiple number, in the fifth embodiment.

The guide frame 110 has a semi-circular shape, and a plurality of these semi-circular guide frames 110 are arranged such that their central parts are stacked to overlap one another.

Here, each guide frame 110 is arranged in a different direction. In other words, the guide frames 110 are arranged such that, when a virtual circle that connects the ends of the guide frames 110 is drawn around the camera module CM, the ends of the guide frames 110 are placed at different positions from one another on the virtual circle.

Further, with the plurality of guide frames 110 stacked, in order to prevent the plurality of guide frames 110 from slipping and deviating from one another, the guide frames 110 are fixed to one another by welding, pressure welding, or an adhesive, etc.

Since the testing means 200 including the moving unit 210 and the testing unit 220 can move from one end of the guide frame 110 only up to the central part of the guide frame 110 due to the central part where the plurality of guide frames 110 are stacked, the testing means 200 may be mounted onto both sides of the guide frame 110 with respect to the center of the stacked guide frames 110.

That is, in FIG. 6, three guide frames 110 are installed, and therefore, six ends of the guide frames 110 are arranged around the camera module CM, and in a virtual circle having the camera module CM as a center, the angle between one end and another adjacent end of the guide frame becomes 60 degrees. In this case, two testing means 200 are used for every guide frame 110, that is, a total of six testing means 200 are used.

As aforementioned, in the apparatus for testing an object according to the fifth embodiment of the present disclosure, each testing means 200 that moves along the guide frame 110 moves along a different trajectory, and therefore the camera module CM may be tested from various positions.

FIGS. 7A and 7B relate to an apparatus for testing an object according to a sixth embodiment of the present disclosure.

Referring to FIGS. 7A and 7B, the apparatus for testing an object according to the sixth embodiment is configured to be similar as that in the fifth embodiment, except that the method for fixing the plurality of guide frames 110 which constitute the guide means 100 is different.

That is, although the plurality of stacked guide frames 110 in the fifth embodiment are fixed by welding, pressure welding or an adhesive, in the sixth embodiment, an opening 112 is formed at a center of every guide frame 110, and the guide frames 110 are stacked such that the openings 112 are in communication with one another, and a connecting pin 120 penetrates the openings 112 to connect the plurality of guide frames 110.

As aforementioned, in the sixth embodiment of the present disclosure, unlike in the fifth embodiment where the guide frames are completely fixed, the guide frames 110 may be dissembled and assembled using the connecting pin 120, thereby enabling the directions of the guide frames 110 to be adjusted suitably according to the type of the camera module CM to be tested.

For example, regarding one certain camera module CM, around a circle having the camera module CM as a center as in the fifth embodiment, the angle between one end and another adjacent end of the guide frames 110 may each be set to 60 degrees, and then a test may be conducted on the camera module CM.

Meanwhile, when a test is conducted on a different camera module CM, it is possible to separate the connecting pin 120, and change the positions of the guide frames 110 such that there are two angles of 30 degrees between two ends of the guide frames 110 and there are four angles of 75 degrees between two ends of the guide frames 110 around the circle having the camera module CM as a center, and then assemble the connecting pin 120 again, and then conduct a test on the camera module CM.

FIG. 8 illustrates an apparatus for testing an object according to a seventh embodiment of the present disclosure.

Referring to FIG. 8, the apparatus for testing an object according to the seventh embodiment of the present disclosure is configured to be almost similar to that in the sixth embodiment, except that here the apparatus for testing an object is configured such that an angle between one end and another adjacent end of the guide frames 110 may be adjusted even without having to dissemble or assemble the apparatus for testing an object.

In other words, in the seventh embodiment, just as in the sixth embodiment, an opening 112 is formed at a center of every guide frame 110, and a plurality of guide frames 110 are stacked such that the openings are in communication with one another, and the connecting pin 120 is coupled to the openings 112, thereby connecting the plurality of guide frames 110.

Here, in the case of the seventh embodiment, the guide frames 110 are configured to be rotatable about the connecting pin 120. Such a configuration that enables the guide frames 110 to be rotatable about the connecting pin 120 may be realized through various well-known techniques, for example, a technique using a sliding member such as a bearing or a roller, but detailed explanation thereof is omitted herein.

As aforementioned, in the seventh embodiment, the plurality of guide frames 110 constituting the guide means 100 are configured to be rotatable about the connecting pin 120, and here it is preferable to form gradations C" (gradations for measuring rotation angle) on the guide frames 110 or on the connecting pin 120, or on both the guide frames 110 and the connecting pin 120, so that the angles by which the guide frames 110 rotates may be measured.

In such a seventh embodiment of the present disclosure, an operator may rotate the guide frames 110 as much as he/she wants without having to dissemble or assemble the guide means 100, to set an angle suitable to the camera module CM to be tested, and thus, the camera module CM may be tested more easily and quickly from various positions.

Meanwhile, in the present specification, it was explained that, in order to identify a moved position of the moving unit 210, gradations C (gradations for measuring moved positions) are formed on the guide means 100 or on the plurality of guide frames 110 constituting the guide means 100, and in order to figure out a moved position of the chart unit 224, gradations C' (gradations for measuring moved positions) are formed on the guide unit 222, but instead of these gradations, a position detection unit (not illustrated) consisting of a position sensor may be separately provided so that one or more of a movement trajectory of the testing means 200, a latitude and a longitude of the testing means 200 may be detected.

Such a position detection unit may be installed integrally with the testing means 200 or separately from the testing means 200, and a control means (not illustrated) may be configured to control the apparatus for testing an object according to the present disclosure in response to the position of the testing means 200 detected by the position detection unit and transmitted thereto, so that the testing of the camera module CM may be conducted more smoothly.

Meanwhile, in the case of the seventh embodiment of the present disclosure, the rotation angles of the plurality of guide frames 110 are measured through the gradations C" (gradations for measuring rotation angle), but the rotation angle of the guide frames 110 may be detected through the position detection unit instead.

The right of the scope of the present disclosure is not limited to the aforementioned embodiments but may be realized in various types of embodiments within the claims attached hereto. It will be apparent to one of ordinary skill in the art that various changes in form and details may be made in these examples without departing from the spirit and scope of the claims and their equivalents.

| REFERENCE NUMERALS | |
|---|---|
| 100: GUIDE MEANS | 110: GUIDE FRAME |
| 112: OPENING | 120: CONNECTING PIN |
| 200: TESTING MEANS | 210: MOVING UNIT |
| 220: TESTING UNIT | 222: GUIDE UNIT |
| 224: CHART UNIT | C, C', C": GRADATIONS |
| CM: OBJECT(CAMERA MODULE) | S: SUPPORT |

What is claimed is:

1. An apparatus for testing an object, the apparatus comprising:
    a guide member maintaining a predetermined distance from an object; and
    a testing apparatus that is mounted onto the guide member such that it is moveable along the guide member to approach or move away from the object in order to test the object,
    wherein the guide member has a shape of a semi-circle,
    wherein the guide member comprises a plurality of semi-circular guide frames having respective central parts stacked on one another, and
    wherein the testing apparatus is mounted onto both sides of the guide frames with respect to the central parts stacked on one another.

2. The apparatus according to claim 1,
    wherein gradations for measuring moved positions of the testing apparatus are formed along a length of the guide member.

3. The apparatus according to claim 1,
    wherein the object is a camera module, and
    the testing apparatus is configured to test at least one of a focus, a short distance resolution, and a long distance resolution of the object.

4. The apparatus according to claim 3,
    wherein the testing apparatus comprises:
    a moving member that is mounted onto the guide member to move along a trajectory of the semi-circular shape of the guide member; and
    a testing member that is mounted onto the moving member and moves toward or away from the object.

5. The apparatus according to claim 4,
    wherein the testing member comprises:
    a guide rod mounted onto the moving member such that one end of the guide rod faces the object and the guide rod moves to or away from the object; and
    a chart coupled to the guide member such that the chart faces the object.

6. The apparatus according to claim 4,
    wherein the testing member comprises:
    a guide rod that is mounted onto the moving member such that one end of the guide rod faces the object; and
    a chart that is coupled to the guide member such that the chart faces the object and moves toward or away from the object in a direction of a length of the guide rod.

7. The apparatus according to claim 5,
    wherein gradations for measuring moved positions of the chart are formed along a length of the guide rod.

8. The apparatus according to claim 6,
    wherein gradations for measuring moved positions of the chart are formed along the length of the guide rod.

9. The apparatus according to claim 5,
    wherein the chart is configured to rotate at its position in a state in which the chart is coupled to the guide rod.

10. The apparatus according to claim 6,
    wherein the chart is configured to rotate at its position in a state in which the chart is coupled to the guide rod.

11. The apparatus according to claim 5,
    the chart further comprising a backlight that emits light by a light source.

12. The apparatus according to claim 6,
    the chart further comprising a backlight that emits light by a light source.

13. The apparatus according to claim 1,
    wherein a plurality of openings are formed at centers of the plurality of guide frames, respectively, and
    the guide member comprises:
    the plurality of the guide frames stacked in a way such that the openings are in communication with one another; and
    a connecting pin that connects the plurality of the guide frames through the openings.

14. The apparatus according to claim 13,
    wherein the plurality of guide frames are configured to rotate about the connecting pin.

15. The apparatus according to claim 14,
    wherein at least one of the plurality of guide frames and the connecting pin are provided with gradations for measuring a rotation angle of the at least one guide frame.

16. The apparatus according to claim 1,
    wherein the testing apparatus is configured to be mounted onto the guide member so as to move by means of a rail or an electromagnet.

17. The apparatus according to claim 1, further comprising a position detector that detects at least one of a movement trajectory of the testing apparatus, a latitude of the testing apparatus and a longitude of the testing apparatus when the testing apparatus moves.

* * * * *